(12) United States Patent
Farley

(10) Patent No.: US 8,410,770 B2
(45) Date of Patent: Apr. 2, 2013

(54) FAST BOOST REGULATOR

(75) Inventor: Joseph D. Farley, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 824 days.

(21) Appl. No.: 12/549,949

(22) Filed: Aug. 28, 2009

(65) Prior Publication Data

US 2010/0308783 A1    Dec. 9, 2010

(30) Foreign Application Priority Data

Jun. 3, 2009  (EP) .................................. 09290410

(51) Int. Cl.
   *G05F 1/40* (2006.01)
(52) U.S. Cl. .................... 323/288; 323/283; 323/284
(58) Field of Classification Search .................. 323/222, 323/282–285, 288, 290, 351
   See application file for complete search history.

(56) References Cited

U.S. PATENT DOCUMENTS

| | | | |
|---|---|---|---|
| 5,612,610 A * | 3/1997 | Borghi et al. ................. | 323/222 |
| 7,327,127 B2 * | 2/2008 | Ho ................................ | 323/271 |
| 7,576,530 B2 * | 8/2009 | Nishida ......................... | 323/285 |
| 7,701,181 B2 * | 4/2010 | Inoue ............................. | 323/268 |
| 7,839,130 B2 * | 11/2010 | Shimizu ......................... | 323/282 |
| 7,990,121 B2 * | 8/2011 | Kojima et al. ................. | 323/282 |
| 2009/0140708 A1 * | 6/2009 | Tateishi et al. ................ | 323/282 |

OTHER PUBLICATIONS

Keskar, N., et al., "Self-Stabilizing, Integrated, Hysteretic Boost DC-DC Converter," The 30th Annual Conference of the IEEE Industrial Electronics Society, IECON 2004, TA3-4.

Viswanathan, K. et al., "A novel tri state boost converter with fast dynamics," IEEE transactions on Power Electronics, vol. 17, No. 5, Sep. 2002, pp. 677-683.

* cited by examiner

*Primary Examiner* — Jessica Han
(74) *Attorney, Agent, or Firm* — William B. Kempler; Wade J. Brady, III; Frederick J. Telecky, Jr.

(57) ABSTRACT

A boost regulator that comprises a capacitor adapted to couple in parallel with a load, a switch coupled to the capacitor and to a diode, a comparator coupled to the load and receiving a reference voltage, and a circuit logic component that receives an output of the comparator and an output of a duty cycle signal generator. An output of the circuit logic component couples to the switch and is capable of activating and de-activating the switch.

17 Claims, 3 Drawing Sheets

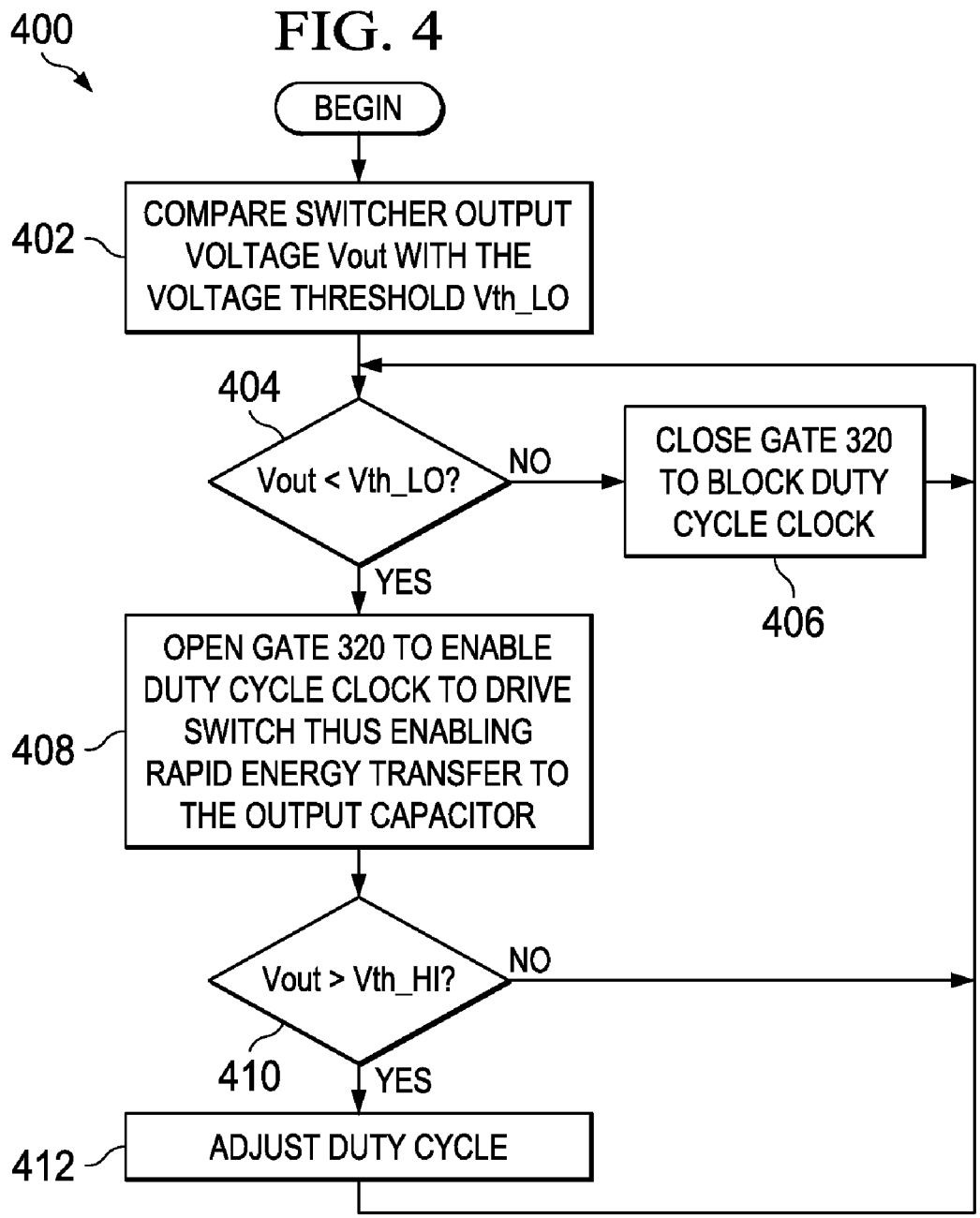

FAST BOOST REGULATOR

CROSS-REFERENCE TO RELATED APPLICATIONS

The present application claims priority to European Patent Application No. 09 290 410.1 filed on Jun. 3, 2009 which is herein incorporated by reference.

BACKGROUND

Many electronic devices contain boost regulators (e.g., direct current (DC)-to-DC boost regulators). When provided a voltage input, these devices provide a regulated voltage gain. If the output voltage drops below a threshold, the regulator causes the output voltage to rise. Once the voltage rises past the threshold, the regulator ceases causing the voltage to rise. Although such regulators generally accomplish their goal of regulating voltage, they are slow to react to changes in output voltage.

SUMMARY

The problems noted above are solved in large part by a technique for quickly adjusting voltage so that the output voltage is regulated and kept above the threshold. An illustrative embodiment includes a boost regulator that comprises a capacitor coupled in parallel with a load, a switch coupled to the capacitor and to a diode, a comparator coupled to the load and receiving a reference voltage, and a circuit logic component that receives an output of the comparator and an output of a duty cycle signal generator. An output of the circuit logic component couples to the switch and is capable of activating and de-activating the switch.

Another illustrative embodiment includes a system that comprises means for storing electrical charge. The means for storing is coupled in parallel with a load. The system also includes means for comparing a voltage across the means for storing with a threshold voltage. The means for comparing produces a comparison signal. The system also comprises means for increasing the voltage across the means for storing when a duty cycle signal and the comparison signal have a common logic status.

Yet another illustrative embodiment includes a method that comprises comparing a voltage output by a voltage regulator with a reference voltage signal, where the voltage regulator is controlled by a transistor. The method also comprises, as a result of the comparison, adjusting the transistor when both a duty cycle clock signal is asserted and the voltage output by the voltage regulator is less than or equal to the reference voltage signal.

BRIEF DESCRIPTION OF THE DRAWINGS

For a detailed description of exemplary embodiments of the invention, reference will now be made to the accompanying drawings in which:

FIG. 4 shows an illustrative flow diagram of a method implemented in accordance with embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The terms "cellular telephone," "cell phone," "mobile," "mobile phone," "handy," "mobile communication device," etc., regardless of whether they are all used in herein, are generally synonymous. The term "beyond" when used in reference to a threshold may mean "lower than" or "higher than."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are various embodiments of a boost regulator that is able to react more quickly to output voltage fluctuations than are boost regulators that do not implement the techniques described herein. Specifically, the boost regulator described herein comprises circuit logic that detects unacceptable output voltage fluctuations and that reacts by quickly adjusting a switch, thereby stabilizing the output voltage within an acceptable range.

Figure 1:
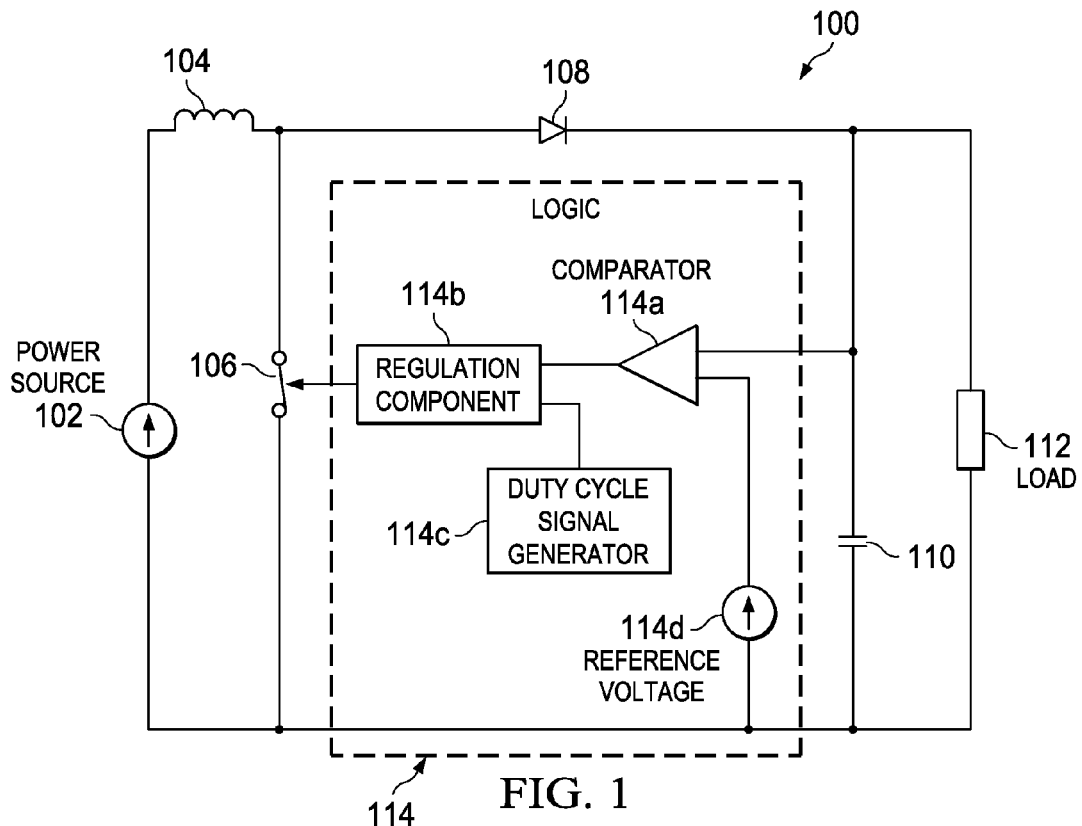
FIG. 1 shows an illustrative boost regulator in a first state, in accordance with embodiments.

FIG. 1 shows an illustrative boost regulator 100. The regulator 100 comprises a power source 102 (e.g., voltage source), an inductor 104, a switch 106 (e.g., a transistor such as an n-type metal oxide semiconductor (NMOS) or p-type metal oxide semiconductor (PMOS)), a diode 108 (e.g., a shotky diode, a flyback diode or other suitable diode or synchronous transistor switch that mitigates or eliminates a sudden voltage spike across the inductor 104 when its supply voltage is reduced), a capacitor 110 and a load 112. The regulator 100 shown in FIG. 1 is in an "on" state, because the switch 106 is closed. When the switch 106 is closed, current passes through a loop containing the power source 102, the inductor 104 and the switch 106. Little to no current passes through the diode 108. When the regulator 100 is in an "on" state, the inductor 104 builds up energy. The switch 106 is controlled by circuit logic stored in circuit logic 114b. It is possible that, due to a variety of factors, the output voltage across the capacitor 110 and/or load 112 may drop below a predetermined threshold level. The logic 114 senses when this occurs and adjusts the switch 106 accordingly. Specifically, a regulation component 114b receives an output of a comparator 114a and an output of a duty cycle signal generator 114c. In turn, the comparator 114a receives the output of a reference voltage 114d and couples to the node between the capacitor 110 and the diode 108, as shown. Based on these inputs, the regulation component 114b controls the switch 106.

Figure 2:
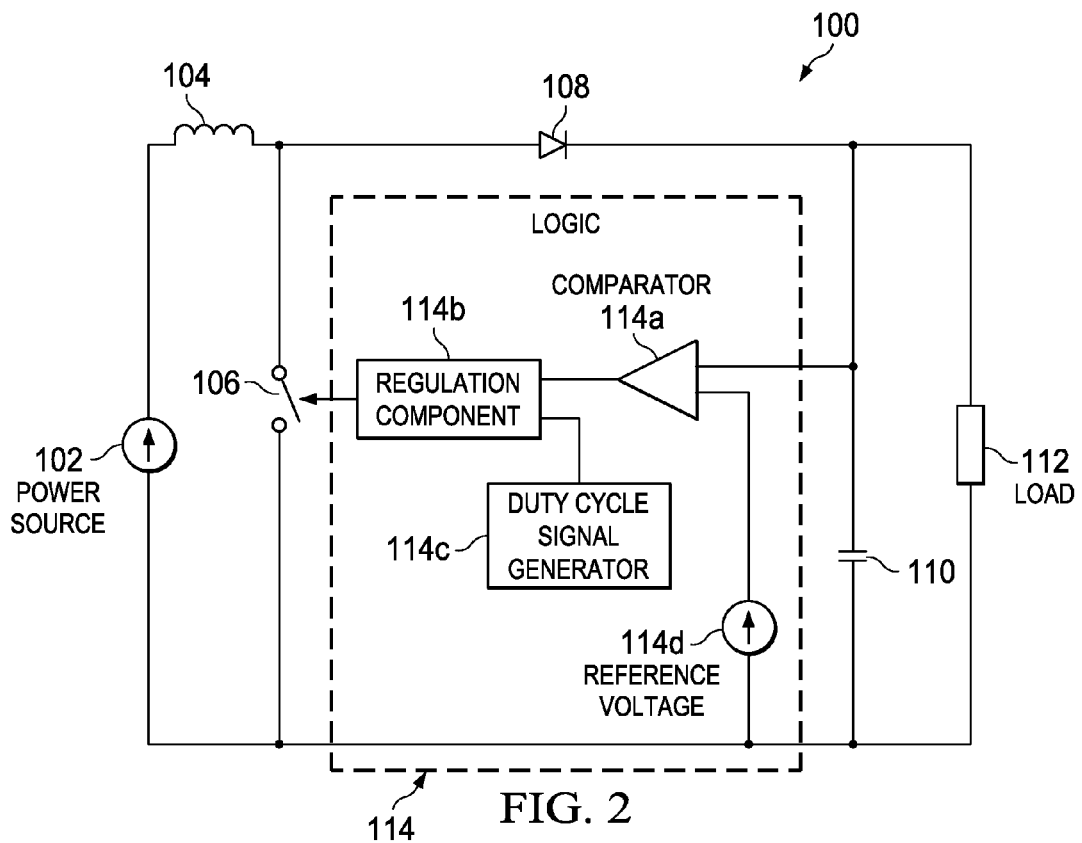
FIG. 2 shows the illustrative boost regulator of FIG. 1 in a second state, in accordance with embodiments.

FIG. 2 shows the illustrative boost regulator 100 of FIG. 1 in an "off" state. The switch 106 is open, thereby causing current to flow through the power source 102, the inductor 104, the diode 108, the capacitor 110 and the load 112. Energy previously stored in the inductor 104 is discharged and provided to the diode 108, capacitor 110 and the load 112. More specifically, at the opening of switch 106 the terminal voltage of the inductor 104 (i.e., the diode-connected end) rises, thus forward-biasing the diode 108, and thereby providing current into the capacitor 110 with the result being that an output voltage is formed across capacitor 110 and the load 112.

Figure 3:
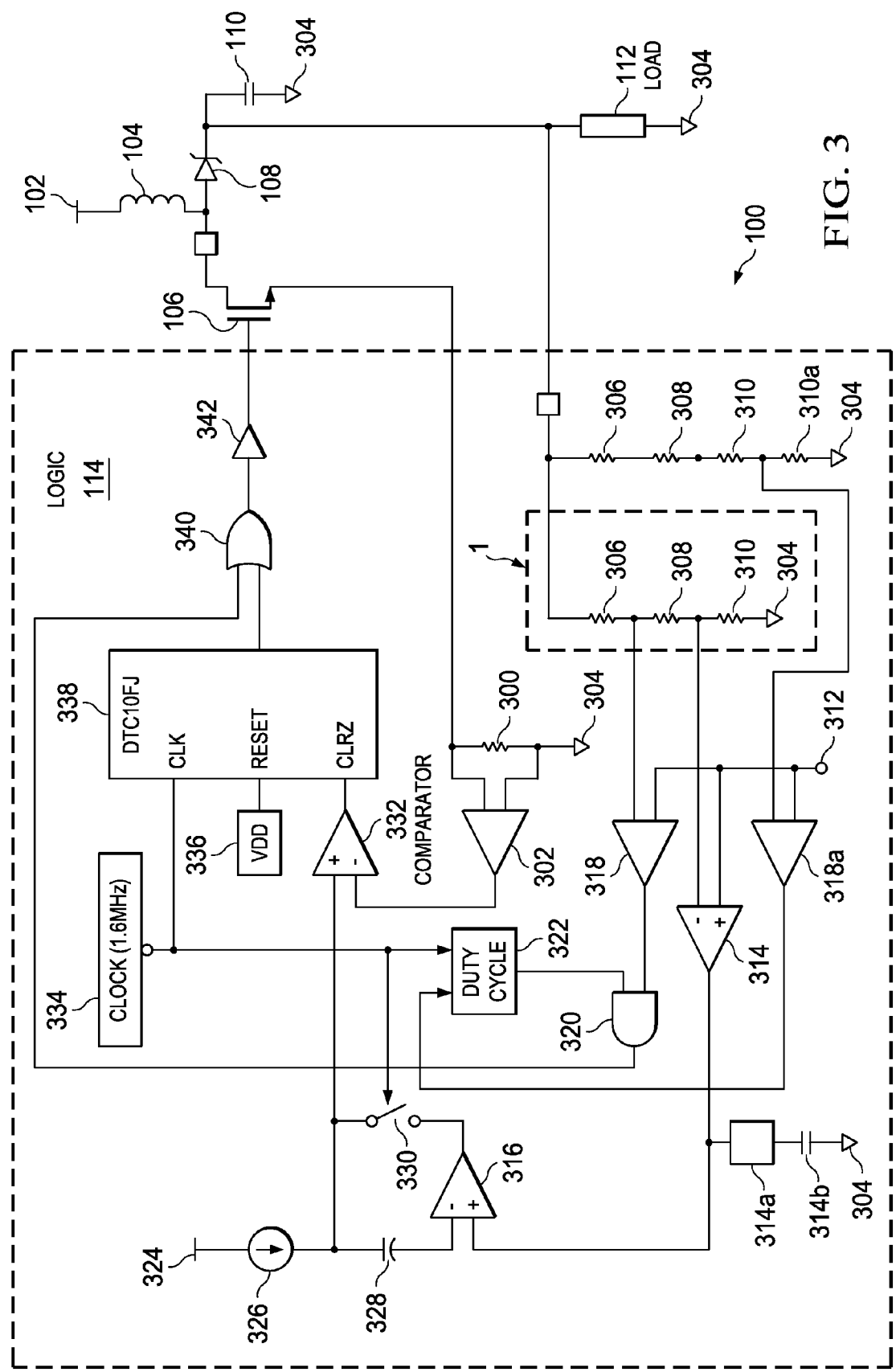
FIG. 3 shows a circuit schematic of an illustrative DC-to-DC boost regulator designed in accordance with embodiments.

FIG. 3 shows a detailed circuit schematic of the regulator 100. The regulator 100 comprises the power source 102, the inductor 104, the switch 106, the diode 108, the capacitor 110, the load 112 and the logic 114. In at least some embodiments, the switch 106 comprises a power NMOS transistor. The logic 114 includes an output voltage monitoring network (OVMRN) 1. The OVMRN 1 includes multiple resistors 306, 308 and 310 and, in some embodiments, has a total resistance value in the range of 1 Mega Ohm (e.g., in cases where low quiescent currents are desirable). Resistances of resistors 306, 308 and 310 are chosen to give a ratio of an output voltage, sensed between resistors 308 and 310, to be equal to Vref (i.e., the reference voltage at 312, represented as voltage 114d in FIGS. 1-2) and the ratio of the output voltage sensed between resistors 306 and 308 to be several tens of millivolts higher than that between resistors 308 and 310. Voltage comparator 318 (referenced as comparator 114a in FIGS. 1-2) uses the same reference voltage Vref connected to its positive terminal 312.

At the desired output voltage, the voltage at the junction of resistors 306 and 308 is higher than the reference voltage Vref; with the shown comparator polarities, the output of comparator 318 will therefore be in the LOW state. It is when the voltage of the resistor junction 306, 308 drops below the reference voltage Vref (e.g., result of a 150 mV fall of the regulated output voltage) that the output of the comparator 318 goes to the HI state, thereby permitting clock signals at AND gate 320 to be propagated through the logic to the switch 106. A fall in the output voltage below the predetermined threshold thus activates the rapid response loop such as to quickly redress the fall in output voltage.

The voltage at the node between resistors 306 and 308 may be defined as the output voltage across the load 112 multiplied by the resistance sum of the resistors 308 and 310 and divided by the resistance sum of the resistors 306, 308 and 310. The voltage at the node between resistors 308 and 310 may be defined as the output voltage across the load 112 multiplied by the resistance of the resistor 310 divided by the resistance sum of the resistors 306, 308 and 310.

The regulation component 114b couples to a gate of the switch 106. In some embodiments, the regulation component 114b includes some or all components present in the logic 114 except for the comparator 114a, duty cycle signal generator 114b and the reference voltage 114d. More specifically, the regulation component 114b may comprise some or all of the following, among other things: an inductor current sensing resistor 300, a current sensing amplifier 302, a ground (GND) connection 304, output voltage monitoring resistors 306, 308 and 310, a reference voltage source 312, voltage amplifier 314, loop compensation RC network 314a (resistor) and 314b (capacitor), amplifier 316, rapid loop comparator 318, an AND gate 320, a duty cycle component 322 (shown as generator 114c in FIGS. 1-2), a voltage source 324, a current source 326, a capacitor 328, a switch 330, another comparator 332, a clock 334 (e.g., capable of producing any suitable frequency, such as 1.6 MHz), a voltage source 336, a latch 338, an OR gate 340 and a transistor driver 342. The values of the various components (e.g., resistors) may be chosen as desired so as to implement the techniques described herein. The relationships between the various components of the regulator 100 are now described in detail.

The amplifier 314 and comparator 318 monitor the output voltage of the regulator 100 as shown. The amplifier 314 receives as one of its inputs the reference voltage signal 312, which may be selected as desired. The amplifier 314 receives as its other input the signal present on the node between the resistors 308 and 310. The amplifier 314 compares its inputs and produces an output signal that is provided to the amplifier 316. The amplifier 316 receives as its other input a signal from capacitor 328. Capacitor 328, current source 326, voltage source 324 and switch 330 together form a slope compensation network. The output of the amplifier 316 determines the lower voltage level when the switch 330 shorts the capacitor 328. The clock signal 334 activates the switch 330, thus discharging the capacitor 328 charged by current source 326.

Judicious choice of capacitor 328 and current source 326 permits the production of a periodic ramp at the clock frequency on capacitor 328. The comparator 332 receives as one of its inputs the ramp signal from switch 330, as shown. At its other input, the comparator 332 receives the output signal from the amplifier 302, which is a current sense component that senses the current that passes through the resistor 300, which, in turn, represents the charging current of inductor 104. The output of the comparator 332 is provided to a "CLRZ," or "clear," input to the latch 338. The latch 338 also has a "RESET" input, to which a constant Vdd voltage signal 336 is applied. The latch 338 also comprises a "CLK" input. The CLK input receives a clock signal from the clock 334, as shown. The clock signal from the clock 334 also is provided to the duty cycle component 322, which, in some embodiments, produces a signal having a clock ratio of 50:50, 25:75, 12:88, or any other suitable ratio. This ratio determines the "ON" to "OFF" time of the switch 106 which, in turn, determines the energy transferred to the capacitor 110 and load 112 during each clock cycle. This ratio preferably is adapted by means of sensing for output voltage rising above a predetermined threshold voltage set by an additional resistor 310a (the resistor string 306, 308, 310 being replaced by string 306, 308, 310, 310a) along with a higher voltage detection comparator 318a coupled to clock duty cycle network 322. A HI voltage at the output lowers the clock signal ON to OFF ratio. The clock signal ratio can thus be selected based onto the loading conditions so as to avoid overcorrecting the fall in output voltage.

The output of the duty cycle component 322 is provided to the AND gate 320. The AND gate 320 also receives an input signal from the output of the comparator 318. The comparator 318 compares the signal present on the node between resistors 306 and 308 against the reference voltage signal 312. The output of the AND gate 320 is provided to the OR gate 340. The OR gate 340 also receives as an input the output of the latch 338. The output of the gate 340 is provided to a driver 342 which, in turn, drives the power NMOS switch 106.

In operation, the driver 342 to the power NMOS switch 106 may be activated via multiple pathways. One of these pathways includes the amplifiers 302, 314 and 316, the RC loop compensation 314a, 314b, the slope compensation network, the comparator 332, the latch 338, and other associated circuit logic. As explained, this pathway, hereinafter referred to as the "first pathway," provides one input to the OR gate 340 and is the active pathway when the output voltage is properly regulated. This first pathway can be likened to react in a continuous, analog manner. Another pathway includes the comparator 318, AND gate 320 and the duty cycle component 322. As explained, this pathway, hereinafter referred to as the "second pathway," provides another input to the OR gate 340. This pathway is triggered only when the output voltage of the regulator 100 falls below a predetermined threshold voltage (e.g., 150 mV below the desired regulated voltage) by quickly providing a signal such that the output of the OR gate 340 also is triggered, thereby causing the driver 342 to drive the power NMOS 106.

The first pathway monitors the output voltage across the load 112 and activates the driver 342 accordingly. The details of how the first pathway works are not essential to the inventor's contribution and thus are not described in detail. It is sufficient to note that as a result of the delay introduced by the loop compensation components 314a, 314b that reduce the bandwidth of the control loop, the time to propagate a correcting signal that activates and de-activates the output driver 342 via the first pathway is significantly longer than it would be via the second pathway. A fast, transient-load current at the output can therefore cause the output voltage to fall rapidly to an unacceptably low value before the primary pathway can make corrections. This delay is particularly egregious when the output voltage crosses the predetermined threshold (going either below the threshold or above the threshold) at a fast rate. Other circuit logic arrangements similar to the circuit logic shown in the first pathway may be substituted for the first pathway but would likely suffer from the same bandwidth-related delay problems. In some embodiments, some or all of the first pathway may be eliminated altogether, thereby possibly obviating the need for the OR gate 340.

In contrast, the second pathway is able to activate and de-activate the driver 342 (and, by extension, the power NMOS 106) quickly relative to the first pathway. The comparator 318 monitors the output voltage by way of the resistor divider network 1. Specifically, the comparator 318 detects when the output voltage falls a predetermined amount (defined by resistance of resistors 308 and 310 divided by the resistance of the network 1) by comparing the voltage at its input to the reference voltage signal 312. The output of this comparison is provided to the AND gate 320. As previously explained, the AND gate 320 also receives an output of the duty cycle component 322. The duty cycle component 322 uses the clock signal provided by the clock 334 to generate a duty cycle as desired and provides the duty cycle signal to the AND gate 320. When the duty cycle signal provided to the AND gate 320 is asserted (or "HIGH") and when the output of the comparator 318 also is asserted, the output of the AND gate 320 is asserted.

When the output of the AND gate 320 is asserted, the output voltage monitored by the comparator 318 is below or equal to the predetermined threshold (i.e., the output voltage is below or equal to the reference voltage signal 312), and so the output voltage should be increased. Assertion of the output of the AND gate 320 results in an increase of this output voltage because it ensures that the output of the OR gate 340 is asserted, thereby causing the driver 342 to drive the power NMOS 106 and increase the output voltage. When the voltage at the junction of resistors 306 and 308 rises above the reference voltage signal 312 (i.e., the threshold voltage; indicating that the output voltage drop has been redressed), the output of the comparator 318 is de-asserted, causing the output of the AND gate 320 to also become de-asserted. As a result, the driver 342 ceases driving the power NMOS 106 via the second pathway, and the first pathway (i.e., the output of the latch 338) is asserted, thus reverting to the principal voltage control regulation.

As mentioned, the various parameters of the circuit logic in the regulator 100 may be selected and/or adjusted as desired. For example, the reference voltage signal 312, which operates as the threshold voltage for the comparator 318, may be static or may be dynamically adjusted. The duty cycle component 322 may be set to produce a duty cycle signal with a desired ratio (e.g., 50:50, 25:75); active selection of the duty cycle may be implemented with an additional comparator that detects whether the output voltage has been overcorrected. In the latter case, a lower duty cycle is selected. Alternatively, in systems where only light load transients are anticipated, the duty cycle logic is set to select and output the minimum duty cycle, which is successively increased until an over-voltage signal is detected at the output of comparator 318a. Although a power NMOS 106 is shown in FIG. 3, other types of transistors or switches may be used. The inductor 104 preferably is between 0.5 uH and 1.5 uH for the switching frequency chosen, but the inductance may be adjusted as desired. In at least some embodiments, the capacitor 110 is between 4 uF and 30 uF, but, as with the other components, this capacitance may be adjusted as desired. The clock 334 in at least some embodiments is set at 1.6 MHz, although other clock speeds may be used. Likewise, the power sources 102, 324, 326 and 336 may be set and/or adjusted as necessary. As mentioned, the sum of the resistors 306, 308 and 310 preferably is in the 1 Mega Ohm range (i.e., to minimize the operating current of the DC-DC converter 100), but the resistances of resistors 300, 306, 308 and 310 may vary.

FIG. 4 shows a flow diagram of an illustrative method 400. The method 400 begins by comparing the switcher output voltage $V_{OUT}$ with a threshold voltage $V_{TH\_LO}$ (block 402). The method 400 continues by determining whether the output voltage is below the threshold $V_{TH\_LO}$ (block 404). If not, the method 400 comprises closing gate 320 to block the duty cycle clock (block 406). Otherwise, the method 400 comprises opening gate 320 to enable the duty cycle clock to drive the switch, thus enabling rapid energy transfer to the output capacitor (block 408). The method 400 then comprises determining whether the output voltage $V_{OUT}$ is greater than a threshold voltage $V_{TH\_HI}$, which may be the same or different than $V_{TH\_LO}$ (block 410). If so, the method 400 comprises adjusting the duty cycle (block 412). Otherwise, control of the method 400 returns to block 404.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A voltage boost regulator, comprising:
   a capacitor adapted to couple in parallel with a load;
   a switch coupled to the capacitor and to a diode;
   a comparator coupled to the load and receiving a reference voltage; and
   a circuit logic component that receives an output of the comparator and an output of a duty cycle signal generator, wherein an output of the circuit logic component couples to the switch and is capable of activating and de-activating the switch;
   an OR gate that receives the output of the circuit logic component and also receives an output of a regulation pathway, and if either received output is asserted, the OR gate causes the switch to be de-activated.

2. The regulator of claim 1, wherein the switch comprises a power n-channel transistor.

3. The regulator of claim 1, wherein the circuit logic component de-activates the switch when a voltage across the capacitor is less than said reference voltage.

4. The regulator of claim 1, wherein the circuit logic component ensures that the switch is activated when a voltage across the capacitor is greater than said reference voltage.

5. The regulator of claim 1, wherein the circuit logic component comprises an AND gate.

6. The regulator of claim 1, wherein the regulation pathway includes a slope compensation network, multiple comparators and a latch.

7. The regulator of claim 1, wherein the regulator comprises a direct current (DC)-to-DC boost regulator.

8. The regulator of claim 1, wherein the capacitor couples in parallel to a load.

9. A system, comprising:
   means for storing electrical charge, said means for storing coupled in parallel with a load, wherein the means for storing electrical charge comprises a capacitor, the means for comparing comprises a comparator, and the means for increasing is selected from the group consisting of an AND gate, an OR gate, a transistor driver, and a transistor;
   means for comparing a voltage across said means for storing with a threshold voltage, said means for comparing produces a comparison signal; and
   means for increasing said voltage across the means for storing when a duty cycle signal and said comparison signal have a common logic status.

10. The system of claim 9, wherein the system comprises a direct current (DC)-to-DC boost regulator.

11. The system of claim 9, wherein the means for increasing includes a power n-channel metal oxide semiconductor (NMOS) transistor.

12. The system of claim 9, wherein the means for increasing increases the voltage across the means for storing when said voltage is less than or equal to said threshold voltage.

13. A method, comprising:
   comparing a voltage output by a voltage regulator with a reference voltage signal, the voltage regulator controlled by a transistor, wherein comparing comprises using a comparator and adjusting said transistor comprises using an AND gate, an OR gate and a transistor driver; and
   as a result of said comparison, adjusting said transistor when both a duty cycle clock signal is asserted and the voltage output by the voltage regulator is less than or equal to said reference voltage signal.

14. The method of claim 13, wherein said transistor comprises a power n-channel metal oxide semiconductor (NMOS) transistor.

15. The method of claim 13, wherein adjusting said transistor comprises adjusting said transistor so that said voltage increases.

16. The method of claim 15, wherein, as a result of said voltage increasing to a level greater than that of said reference voltage signal, re-adjusting said transistor to a different state.

17. The method of claim 13, wherein said voltage regulator comprises a direct current (DC)-to-DC boost regulator.

* * * * *